April 8, 1930. R. P. JACQUES 1,753,465
MEANS FOR MAKING FLEXIBLE TUBULAR CONDUITS
Filed April 30, 1928
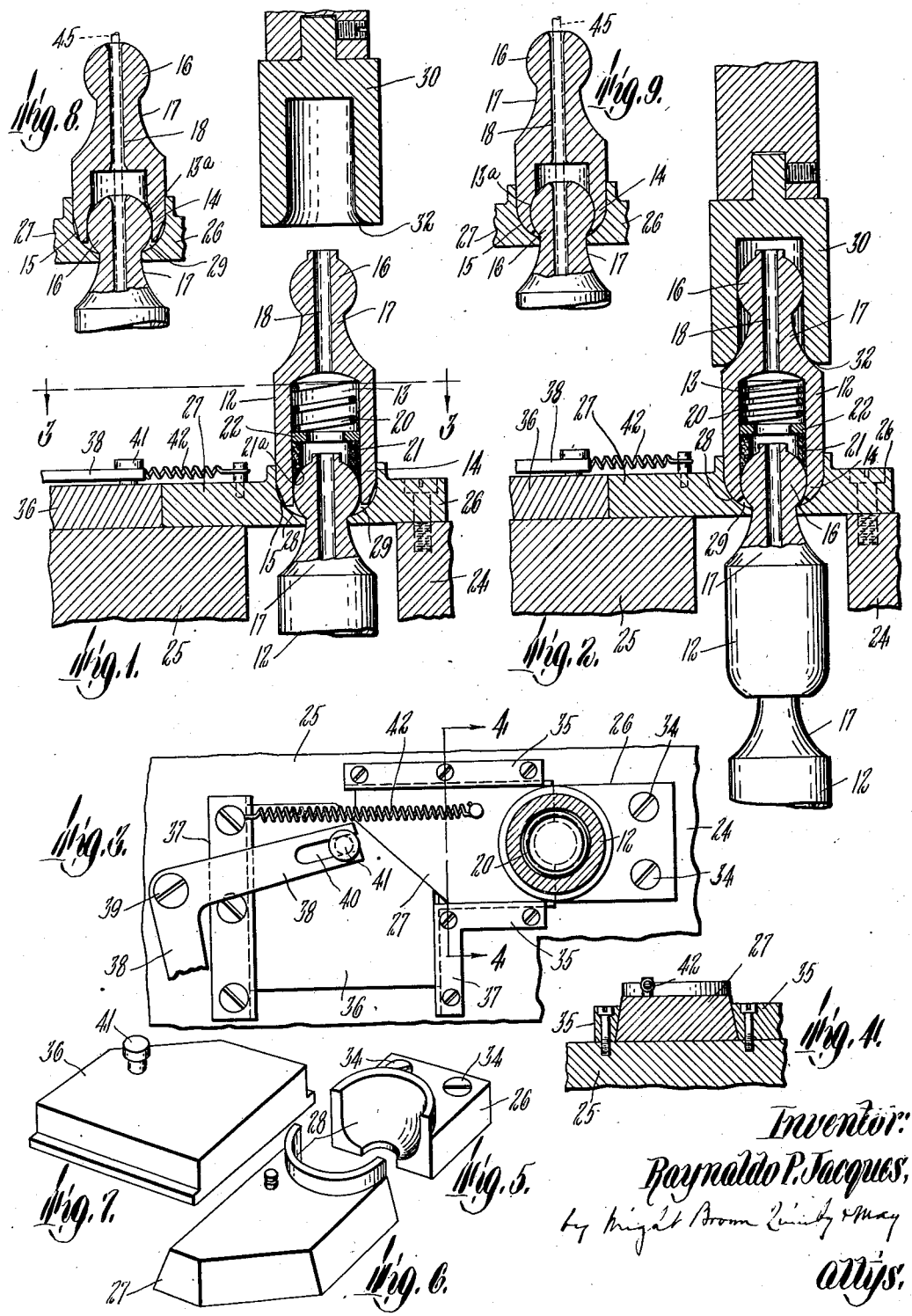
Inventor:
Raynaldo P. Jacques,
by Wright Brown Quinby & May
attys.

Patented Apr. 8, 1930

1,753,465

UNITED STATES PATENT OFFICE

RAYNALDO P. JACQUES, OF WOONSOCKET, RHODE ISLAND, ASSIGNOR TO ADAMS INDUSTRIES, INC., OF NEW YORK, N. Y., A CORPORATION OF NEW YORK

MEANS FOR MAKING FLEXIBLE TUBULAR CONDUITS

Application filed April 30, 1928. Serial No. 273,914.

This invention relates to the manufacture of a tubular conduit composed of a plurality of tubular metallic sections or units, articulately connected with each other, end to end, by ball and socket joint members integral with the units and interengaged, so that the conduit may be universally flexed to a limited extent.

A conduit thus characterized is disclosed by my application entitled Flexible tubular conduit, filed June 7, 1927, Serial No. 197,129, the conduit being adapted to conduct a lubricant under pressure, such as grease from a grease-gun or pressure system, to a receiving cup or nipple communicating with a bearing to be lubricated, or to conduct a fluid, such as steam, air, or water under pressure.

The invention is embodied in the improved hereinafter described and claimed means for making a flexible conduit.

Of the accompanying drawings forming a part of this specification,—

Figures 1 and 2 are sectional views, illustrating the preferred form of means embodying the invention.

Figure 3 shows in section, on lines 3—3 of Figure 1, one of the units, and in plan, the supporting and forming die shown in section by Figure 1, below said line.

Figure 4 is a section on line 4—4 of Figure 3.

Figures 5 and 6 show separately, in perspective, the members of the supporting and forming die.

Figure 7 shows in perspective, the wedge block shown in plan by Figure 3.

Figures 8 and 9 are views similar to portions of Figures 1 and 2, showing modifications.

The same reference characters indicate the same parts in all of the figures.

In making a flexible tubular conduit from a plurality of tubular sections or units, I provide each unit with a relatively large cylindrical end portion 12, a relatively large bore 13 therein, and a contractible end zone 14, constituting the mouth portion of said bore, and rendered contractible by forming an annular beveled face 15, preferably on its external surface. I also provide each unit with a smaller end portion having a ball-shaped terminal 16, a reduced neck 17, and a smaller bore 18.

The units formed as shown, may be rapidly and automatically produced by any suitable and automatically produced by any suitable machine, such as an automatic screw machine, from a rod of metal which is suitably ductile, to permit the contraction of the end zone 14, and the conversion of the same into a socket member, as next described.

The units are assembled so that the terminal 16 of each unit is inserted in the contractible mouth formed by the end zone 14 of the next unit, and said mouth is contracted on the inserted terminal, as indicated by Figure 2, to form a socket member which confines the terminal in the larger bore, and permits limited universal conduit-flexible movements of the units thus connected, the contracted end of the socket mouth being of larger diameter than the portion of the neck 17 adjoining the terminal 16.

Before assembling the units, I insert in the larger bore 13 of each, a spring 20, an annular packing washer 21, of compressible material, and an intermediate annular metal washer 22. The packing washer has a cupped annular face 21ª formed to bear closely on one side of an inner zone of the terminal 16, and pressed against said zone, when the units are connected, by the spring 20 and metal washer 22. The spring 20 normally projects the washer 21 into the end zone 14, as shown by Figure 1. The operation of contracting the mouth formed by the end zone not only forms a socket member bearing on one side of, and confining the inserted terminal, but also causes the opposite side of the terminal to force the washer into the bore 13, and tension the spring 20, so that the spring maintains the washer in close packing contact with the terminal. The cupped end face 21ª of the washer constitutes, in effect, a cupped portion of the bore 13, co-operating with the contracted end zone 14 in confining the terminal 16 against movement lengthwise of the bore, in either direction.

Any suitable means may be employed for supporting the terminal 16 of one unit, and contracting the zone 14 of another unit upon it. I prefer to employ the means shown by the drawing, and next described.

Unyieldingly supported by spaced apart fixed base members 24 and 25, are two members 26 and 27 of a supporting and forming die. Said die members are adapted to be closed upon and engage the neck 17, of one unit, and support the terminal 16 thereof, and are provided with opposed concave faces 28, which are separated from the supported terminal by an annular converging space 29 (Figure 1), when the die is closed. Said faces are formed to receive the uncontracted end zone of another unit, and support the latter in a raised position in the space 29, as shown by Figure 1.

Movable in axial alinement with the two units supported as shown by Figure 1, is a pressing member 30, having a preferably annular pressing face 32, formed to bear on the neck 17 of the raised unit, as shown by Figure 2. Power may be exerted on the pressing member by any suitable means, to cause it to force the compressible end zone on the upper unit into the converging space 29, surrounding the terminal of the lower unit, thereby contracting the end zone 14 of the upper unit, as shown by Figure 2, and forming a socket member confining the terminal 16 of the lower unit, the contracting operation forcing the inserted terminal against the washer 21, pressing the washer inwardly and tensioning the spring. When the die is opened, the connected units may be lowered until the terminal 16 of the upper unit is between the die members, the die being then closed and the described operation repeated. In this way, a conduit of any desired length may be formed step by step.

The die member 26 may be fixed as by screws 34, to the base member 24, the die member 27 being slidable on the base member 25, between guides 35. The slidable die member may be projected by a wedge block 36, reciprocable in guides 37 on the base member by a bell-crank lever 38, fulcrumed at 39, and having a slot 40 in one of its arms, receiving a stud 41 on the wedge block. Movement of the lever in one direction projects the die member 27. Movement of the lever in the opposite direction permits the retraction of said die member by a spring 42.

The conduit may be adapted, as shown by Figures 8 and 9, to contain a conducting cable 45, shown by dotted lines in Figure 9, the washer 21 and spring 20 being omitted, and the larger bore 13 provided with a cupped annular face 13ª, which bears on an inner zone of the terminal 16, as shown by Figure 9, when the zone 14 is contracted. The cupped face 13ª has the same function as the cupped end face 21ª of the washer 21, in that it cooperates with the contracted end zone 14 in confining the terminal 16 against movement in either direction lengthwise of the bore 13.

I claim:

Means for flexibly connecting tubular conduit sections or units, each of which includes a relatively large cylindrical end portion, a relatively large bore therein, a contractible end zone thereon, constituting the mouth portion of the bore, and a smaller end portion having a ball-shaped terminal, a reduced neck, and a smaller bore; said means comprising a supporting and forming die, composed of separable unyieldingly supported members, adapted to be closed upon and engage the neck of one unit, and support the terminal thereof, and having opposed concave forming faces, separated from said terminal by an annular converging space when the die is closed, the die faces being formed to support the end zone of another unit in a raised position above the die space, a pressing member movable toward and from the die and formed to bear on the neck of the raised unit and force the compressible end zone of the latter into said converging space, thereby forming a socket member confining the terminal of the die-supported unit, and permitting limited universal turning movements of the connected units, when the die is opened, and means for closing and opening the die.

In testimony whereof I have affixed my signature.

RAYNALDO P. JACQUES.